United States Patent [19]
Lange et al.

[11] 3,898,261
[45] Aug. 5, 1975

[54] PROCESS FOR PRODUCTION OF ALKYLSULPHONIC ACID ESTERS

[75] Inventors: Rolf Lange, Krefeld-Urdingen; Harry Welz, Krefeld, both of Germany

[73] Assignee: Bayer Aktiengesellschaft, Germany

[22] Filed: May 20, 1974

[21] Appl. No.: 471,493

Related U.S. Application Data

[63] Continuation-in-part of Ser. No. 461,377, April 16, 1974, abandoned.

[30] Foreign Application Priority Data
Apr. 21, 1973 Germany............................ 2320417

[52] U.S. Cl........................... 260/456 P; 260/621 R
[51] Int. Cl............................................ C07c 143/00
[58] Field of Search................................. 260/456 P

[56] References Cited
UNITED STATES PATENTS
2,782,217   2/1957   Dazzi............................... 260/456 P Primary Examiner—Howard T. Mars
Assistant Examiner—Nicky Chan
Attorney, Agent, or Firm—Connolly and Hutz

[57] ABSTRACT

Production of alkylsulphonic acid phenylesters which are long-chain alkylated or polyalkylated on the phenyl nucleus, wherein an alkylsulphonic acid phenylester is reacted with long-chain monoalkylated or polyalkylated phenols in the presence of alkali hydroxide. The compounds, which may be used as plasticisers, are produced with the least expenditure and with high yields.

7 Claims, No Drawings

PROCESS FOR PRODUCTION OF ALKYLSULPHONIC ACID ESTERS

CROSS-REFERENCE TO RELATED APPLICATION

This application is a continuation-in-part of application Ser. No. 461,377 filed Apr. 16, 1974 and now abandoned.

A process described in the literature which is frequently used for the production of alkylsulphonic acid esters is based on the reaction of alkylsulphonic acid chlorides with alcohols or phenols at low temperatures in the presence of HCl-acceptors, for example ammonia or alkali hydroxide.

In cases where it is proposed to use the resulting alkylsulphonic acid esters as plasticisers, phenol, cresol or xylenol and alkylsulphonic acid chlorides obtained by the partial sulphochlorination of paraffin fractions having a chain length of from 10 to 20 carbon atoms, are generally used as the esterification components. With increasing degree of sulphochlorination, the resulting alkylsulphonic acid chlorides contain increasing quantities of chlorine in the alkyl chain and also increasing quantities of difunctional and polyfunctional sulphochlorides. The phenolic esterification component is frequently used in an excess in order to suppress rehydrolysis of the alkylsulphonic acid chlorides which also takes place to a limited extent in addition to the esterification reaction. Since the hydrolysis products of the alkylsulphonic acid chlorides are excellent emulsifiers, their presence in the reaction mixture gives rise to considerable difficulties during working up.

The known process is easy to carry out and gives good ester yields in cases where the paraffin which is not reacted by the partial sulphochlorination and the phenolic component used in excess can be removed from the ester either by distillation or by extraction so that the ester can be separated from the phenolic component and the phenolic component from the paraffin. It is only if the phenolic component is completely removed from the paraffin that the unreacted paraffin can be re-sulphochlorinated. However, separation can only be carried out without difficulties providing the phenolic component, or its alkali salt if any, is soluble in water or its boiling point outside the boiling range of the paraffin mixture. These conditions are satisfied by a number of different phenolic compounds, for example, phenol, cresol and xylenol, with the result that these esters can be obtained in high yields, i.e., with low consumption of the starting materials, by the known process.

In cases where phenolic esterification components, which either as such or in the form of alkali salts, are substantially insoluble in water and which have boiling points within the boiling range of the paraffin fraction, are used, considerable difficulties and expense are involved in separating the ester or the paraffin unreacted during the sulphochlorination reaction from the phenolic component. These difficulties arise for example in cases where phenolic components corresponding to the formula

in which $R_1$ is an alkyl group having eight to 13 carbon atoms, are used or in cases where phenols corresponding to the formula

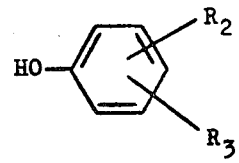

in which $R_2$ and $R_3$ represent alkyl groups which together contain from eight to 18 carbon atoms, are used.

Since, in addition to the difficulties of separation referred to above, the aforementioned phenols are also less reactive than phenol, cresol and xylenol, hydrolysis of the alkylsulphonic acid chlorides in a secondary reaction reduces the ester yield accordingly.

It has now been found that alkylsulphonic acid phenyl esters long-chain alkylated or polyalkylated on the aromatic nucleus which, as already mentioned, can only be obtained in poor yields by the conventional process despite the considerable outlay which it involves, can be obtained in high yields by a process which does not involve any of the difficulties just described.

Accordingly, the invention provides a process for the production of alkylsulphonic acid phenyl esters long-chain alkylated or polyalkylated on the phenyl nucleus, which is characterised by the fact that alkylsulphonic acid phenyl esters having 10 to 18 carbon atoms in the alkyl chain are reacted with monoalkylated or polyalkylated phenols at temperatures in the range of from 100° to 250°C, preferably at temperatures of from 120° to 200°C, in the presence of from 0.5 to 10% by weight, preferably from 0.5 to 2% by weight, based on the starting ester, of alkali hydroxide, such as $Ca(OH)_2$, $NH_4OH$, NaOH and/or KOH, the phenolic compound present in the starting ester being continuously distilled off either under normal pressure or in vacuo, optionally even with the assistance of an under the reaction conditions inert entraining gas, such as nitrogen.

The following compounds represent suitable phenolic reaction components:

(1) 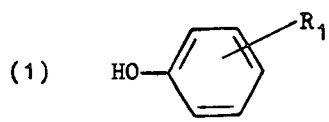 in which $R_1$ is a linear or branched alkyl group having 8 to 13 carbon atoms (2) 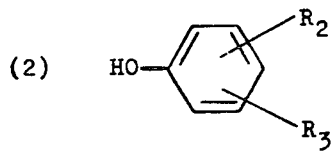 in which $R_2$ and $R_3$ are linear or branched alkyl groups having a total of 8 to 18 carbon atoms (3) 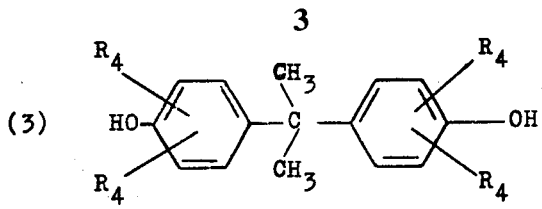

in which $R_4$ represents identical or different halogens, such as chlorine and/or bromine, or hydrogen (4) 

or (5) 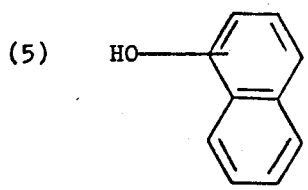

It is of course also possible to use mixtures of the aforementioned compounds. The substituents $R_2$ and $R_3$ are preferably linear or branched alkyl groups having eight to 13 carbon atoms. In general, the following compounds are particularly suitable: octylphenol, isooctylphenol, nonylphenol, isononylphenol, dodecylphenol, isododecylphenol, dibutylphenol, 4,4'-(dihydroxydiphenyl)-2,2-propane, 4,4'-(dihydroxy-3,5,3',5'-tetrachloro(tetrabromo)diphenyl)-2,2-propane, o-hydroxydiphenyl, α-naphthol and β-naphthol.

Alkylsulphonic acid phenyl esters having 10 to 18 carbon atoms in the alkyl chain, optionally substituted by up to two $C_1$- to $C_3$-alkyl groups on the phenyl nucleus, are used as starting compounds for the process according to the invention. It is preferred to use alkylsulphonic acid phenyl esters, alkysulphonic acid cresyl esters and alkylsulphonic acid xylenyl esters.

The phenolic esterification components are used in molar ratios in the range of from 1.0 : 1 to 2 : 1 and preferably in molar ratios in the range of from 1.1 : 1 to 1.4 : 1, based on the alkylsulphonic acid ester.

The reaction time amounts to from about 1 to 12 hours, preferably to from 2 to 8 hours.

The reaction temperature is in the range of from 100° to 250°C, preferably in the range from 120° to 200°C.

The alkali hydroxide present in the crude ester on completion of the reaction can readily be washed out with water, optionally with small quantities of bleaches, for example NaOCl or peroxides, added thereto.

The washed, crude ester is distilled in order to separate residues of the phenolic components used for the reaction, and in addition may optionally be bleached with about 1% of Fuller's earth.

It is essential so far as the reaction is concerned that the phenolic component present in the starting ester should be more readily volatile than the esterification component used for the reaction.

It is known that alkylsulphonic acid phenyl, cresyl and xylenyl esters are particularly stable to the hydrolysing effect of alkaline reagents. Accordingly, it is surprising and had by no means been expected that optionally substituted alkylsulphonic acid phenyl esters should lend themselves to reaction with phenolic components in the presence of NaOH for example to form the corresponding esters.

One of the advantages of the process according to the invention is that it is now also possible to obtain from an alkylsulphonic acid ester without difficulty and in high yields alkylsulphonic acid esters of the kind which, hitherto, it has only been possible to obtain in poor yields and with considerable difficulties. Another advantage is that the chain chlorine content in the esters obtainable by the new process is greatly reduced with the result that there is considerably less danger of HCl being eliminated from the alkyl chain of the sulphonic acid component of the ester under the effect of heat during processing of the ester in plastics. Yet another advantage is that mixtures of different alkylsulphonic acid esters can be obtained in a single operation by the process according to the invention. The compounds or mixtures of compounds thus obtained can be used as plasticisers for plastics.

The alkyl sulphonic acid phenylesters of formula (I) can be used as plasticisers for polymers such as, for example, PVC and for the corresponding copolymers with vinyl esters, such as vinyl acetate, olefins, such as ethylene and propylene, or α,β-unsaturated monocarboxylic and dicarboxylic acid esters, such as acrylates and methacrylates, and natural and/or synthetic rubbers. Depending on the polymer, they may be added in quantities of from 1 to 70 parts by weight and preferably in quantities of from 10 to 50 parts per 100 parts of polymer. They are incorporated into the polymer by means of conventional mixing machines such as cylinders, kneaders, internal mixers, by the dry-blend process or by way of a paste-processing stage. The working-in and processing temperatures and times are governed by the particular mixing process adopted. For example, the temperature can amount to between 20° and 200°C.

The invention is illustrated by, but by no means limited to, the following Examples.

EXAMPLE 1

In a 1 litre three-necked flask equipped with a stirrer, thermometer and dephlegmator, 330 g of alkylsulphonic phenyl ester with a $C_{10}$ to $C_{18}$-alkyl radical and 275 g of nonylphenol were heated to 160°C in a vacuum of about 30 Torr in the presence of 4.4 g of 45% sodium hydroxide as catalyst. The water introduced with the sodium hydroxide initially distilled off, followed to a greater extent by phenol when nitrogen was introduced (0.5 litre per hour). The reaction was terminated after about 5 hours, by which time about 85 g of phenol, of which about 85% consists of phenol and about 15% of nonylphenol, had distilled over. The excess nonylphenol present in the reaction product was then distilled off at 180°C under a vacuum of 15 Torr by introducing 140 g of steam. The crude ester accumulating as the sump product was then extracted with water to separate off Na-salts and bleached with 1% of Fuller's earth (Tonsil).

| Yield: | 410 g of alkylsulphonic acid nonylphenyl ester |
|---|---|
| Density: | 1.007 g/cc |
| Viscosity: | 915 cP at 25°C |
| OH-number: | 4 |
| Chlorine content: | 0.8% |
| (Chlorine content of the starting compound: | 1.9%) |

EXAMPLE 2

In the laboratory apparatus described in Example 1, 330 g of alkylsulphonic acid phenyl ester with a $C_{10}$ to $C_{18}$-alkyl radical were reacted with 320 g of dodecylphenol at a temperature of 190°C, the other reaction conditions being as described in Example 1. After about 3 hours, a phenol/dodecylphenol mixture containing more than 80% of phenol accumulated as distillate in a quantity of 89 g. The crude ester was worked up in the same way as described in Example 1.

| Yield: | 470 g of alkylsulphonic acid dodecylphenyl ester |
|---|---|
| Density: | 0.997 g/cc |
| Viscosity: | 1,200 cP at 25°C |
| OH-number: | 5 |
| Chlorine content of the alkylsulphonic acid dodecylphenyl ester: | 0.7% |

EXAMPLE 3

A mixture of 330 g of alkylsulphonic acid phenyl ester having a $C_{10}$ to $C_{18}$-alkyl radical, 260 g of dibutylphenol and 6 g of 45% NaOH were reacted at 200°C in the same apparatus as used in Example 1. The reaction time was 14 hours. The reaction product was worked up as described in Example 1.

| Yield: | 381 g of alkylsulphonic acid dibutylphenyl ester. |
|---|---|

EXAMPLE 4

In the apparatus described in Example 1, 330 g of alkylsulphonic acid phenyl ester with a $C_{10}$ to $C_{18}$-alkyl radical and 114 g of bis-(hydroxyphenyl)-2,2-propane were heated under a vacuum of 20 Torr to a temperature of 160° to 200°C in the presence of 4 g of a 45% NaOH solution. 82 g of phenol and 2 g of water distilled off. Unreacted bis(hydroxyphenyl)-2,2-propane and semiester formed proportionately were extracted three times with 100 g of 5% sodium hydroxide. This was followed by washing twice with water.

Crude ester accumulated in a quantity of 355 g. Extraction with sodium hydroxide left 225 g with a density of 1.071 g/cc, a viscosity of 9,300 cP at 25°C and an OH-number of 5.

EXAMPLE 5

In the apparatus described in Example 1, 330 g of alkylsulphonic acid phenyl ester with a $C_{10}$ to $C_{18}$-alkyl radical and 255 g of o-hydroxydiphenyl were mixed with 4.4 g of 45% NaOH solution and slowly heated to 170°C in a vacuum of 20 Torr. Phenol began to distill off after a short time. The reaction was complete when, after about 6 hours, 86 g of phenol had distilled over. The crude ester was worked up in the same way as described in Example 4.

| Yield: | 430 g of alkylsulphonic acid diphenyl ester |
|---|---|
| Density: | 1.078 g/cc |
| Viscosity: | 563 cP at 25°C |
| OH-number: | 2 |

EXAMPLE 6

In the apparatus described in Example 1, 330 g of alkylsulphonic acid phenyl ester having a $C_{10}$ to $C_{18}$-alkyl radical and 180 g of α-naphthol were heated in vacuo (15 Torr) to 168°C in the presence of 4.4 g of 45% NaOH solution phenol (81 g in all) slowly distilled off. The reaction was complete after 10 hours. Excess α-naphthol was removed by extraction with NaOH-solution in the same way as described in Example 4. 370 g of alkylsulphonic acid naphthyl ester were obtained after washing with water, drying and bleaching with Tonsil.

EXAMPLE 7

In a 1 litre three-necked flask equipped with a stirrer, thermometer and dephlegmator, 330 g of alkylsulphonic acid-(m,p)-cresyl ester having a $C_{10}$ to $C_{18}$-alkyl radical and 275 g of nonylphenol were heated initially to 165°C and then to a temperature of 200°C in a vacuum of around 32 Torr in the presence of 4.4 g of 45% sodium hydroxide as catalyst. The water introduced with the sodium hydroxide initially distilled off followed to a greater extent by (m,p)-cresol when nitrogen was introduced (0.5 l/hour). The reaction was terminated after about 4 hours, by which time around 94 g of cresol distillate, of about 85% consisted of cresol and about 15% of nonylphenol, had distilled over. The excess nonylphenol present in the reaction product was then distilled off at 180°C under a vacuum of 30 Torr by the introduction of 300 g of steam. The crude ester which accumulated as sump product was then extracted twice with 75 g of 10% NaCl solution to separate off Na-salts, and bleached with 1% of Tonsil.

| Yield: | 405 g of alkylsulphonic acid nonylphenyl ester |
|---|---|
| Density: | 1.006 g/cc |
| Viscosity: | 890 cP at 25°C |
| OH-number: | 6 |
| Chlorine content: | 0.8% |
| (Chlorine content of the starting compound): | 1.9% |
| Volatility: | 0.35% |

What is claimed is:

1. A process for producing an alkylsulphonic acid phenylester which is long chain alkylated or polyalkylated on the phenyl nucleus wherein an alkylsulphonic acid phenylester having from 10 to 18 carbon atoms in the alkyl moiety and having up to two $C_1$ to $C_3$ alkyl substituents on the phenyl nucleus is reacted with a phenol of the formula (1) 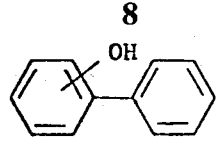

(2) 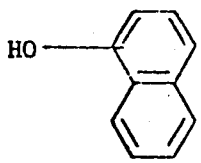

(3) 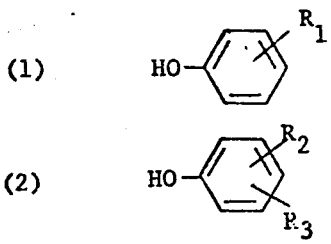

(4) 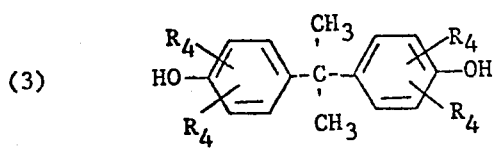

or (5)

wherein $R_1$ is alkyl having eight to 13 carbon atoms, $R_2$ and $R_3$ are alkyl having a total of eight to 18 carbon atoms and each $R_4$ considered separately is hydrogen, chlorine or bromine, at a temperature of from 100° to 250°C. in the presence of from 0.5 to 10% by weight of an alkali metal hydroxide while continuously distilling off by-product phenol having up to two $C_1$ to $C_3$ alkyl substituents, the molar ratio of said phenol to said alkylsulphonic acid phenylester being from 1.0:1.0 to 2.0:1.0.

2. The process of claim 1 wherein said temperature is from 120° to 200°C.

3. The process of claim 1 wherein said reaction takes place in the presence of from 0.5 to 2.0% by weight of alkali metal hydroxide.

4. The process of claim 1 wherein the alkali metal hydroxide is sodium hydroxide or potassium hydroxide.

5. The process of claim 1 wherein said reaction takes place in the presence of a reaction inert entraining gas.

6. The process of claim 5 wherein said reaction inert entraining gas is nitrogen.

7. The process of claim 1 wherein said molar ratio is from 1.0:1.0 to 1.4:1.0.

* * * * *